United States Patent
Kuwahara

(10) Patent No.: US 9,414,420 B2
(45) Date of Patent: Aug. 9, 2016

(54) METHOD OF CONTROLLING NOTIFICATION AT A COMMUNICATION TERMINAL

(75) Inventor: Masato Kuwahara, Kyoto (JP)

(73) Assignee: NINTENDO CO., LTD., Kyoto (JP)

( * ) Notice: Subject to any disclaimer, the term of this patent is extended or adjusted under 35 U.S.C. 154(b) by 0 days.

(21) Appl. No.: 13/416,435

(22) Filed: Mar. 9, 2012

(65) Prior Publication Data

US 2013/0166679 A1 Jun. 27, 2013

(30) Foreign Application Priority Data

Dec. 26, 2011 (JP) .................................. 2011-283691

(51) Int. Cl.
- *G06F 15/16* (2006.01)
- *H04W 76/02* (2009.01)
- *H04W 4/02* (2009.01)

(52) U.S. Cl.
CPC ............ *H04W 76/023* (2013.01); *H04W 4/023* (2013.01)

(58) Field of Classification Search
CPC ... H04W 76/023; H04W 4/023; H04W 88/02; G06F 15/16; G06F 15/173; G06F 2201/81; G06Q 30/02; H04L 65/10; H04L 5/0082
See application file for complete search history.

(56) References Cited

U.S. PATENT DOCUMENTS

| | | | | |
|---|---|---|---|---|
| 8,667,413 | B2 * | 3/2014 | Cheng | G06F 3/0236 345/160 |
| 8,667,513 | B1 * | 3/2014 | Shah | H04W 52/0206 719/328 |
| 2002/0029273 | A1 * | 3/2002 | Haroldson | H04L 12/185 709/226 |
| 2004/0029783 | A1 * | 2/2004 | Stec | A61K 9/0043 514/548 |
| 2004/0039783 | A1 * | 2/2004 | Su | H04L 12/587 709/206 |
| 2005/0027818 | A1 * | 2/2005 | Friedman et al. | 709/217 |
| 2005/0209927 | A1 * | 9/2005 | Aaltonen | G06Q 30/0601 705/26.1 |
| 2005/0246447 | A1 * | 11/2005 | Smidt | H04L 12/2602 709/229 |
| 2006/0224730 | A1 * | 10/2006 | Fok et al. | 709/224 |
| 2008/0092230 | A1 * | 4/2008 | Addy | 726/19 |
| 2008/0096522 | A1 * | 4/2008 | Kuramatsu | H04W 88/02 455/405 |
| 2009/0203360 | A1 * | 8/2009 | Lazaridis | H04M 3/42263 455/414.1 |
| 2009/0210940 | A1 * | 8/2009 | Dean | 726/19 |
| 2009/0249454 | A1 * | 10/2009 | Yamamoto et al. | 726/5 |
| 2009/0307349 | A1 * | 12/2009 | Harris | G06F 15/173 709/224 |
| 2010/0217837 | A1 * | 8/2010 | Ansari et al. | 709/218 |
| 2011/0029611 | A1 * | 2/2011 | Hutchison | G06Q 30/02 709/204 |
| 2012/0218938 | A1 * | 8/2012 | Tomizawa et al. | 370/328 |

FOREIGN PATENT DOCUMENTS

JP 2004-133746 4/2004

OTHER PUBLICATIONS

Nintendo of America Inc., "Nintendo 3DS Operations Manual", 108 pages, and English-language Translation, 52 pages.

* cited by examiner

*Primary Examiner* — Ario Etienne
*Assistant Examiner* — Kidest Mendaye
(74) *Attorney, Agent, or Firm* — Nixon & Vanderhye, P.C.

(57) ABSTRACT

A method of communicating between first and second communication terminals includes: exchanging data between the first and second communication terminals, the second communication terminal being located within a predetermined range relative to the first communication terminal; and notifying, at the first communication terminal, a user of the first communication terminal of an exchange of data after waiting for a predetermined time period from exchange of data.

17 Claims, 4 Drawing Sheets

| PRIVACY LEVEL | TIMING OF EMISSION |
|---|---|
| 5 | EMISSION INACTIVATED (I.E., ACTIVATED WITH INFINITE DELAY). |
| 4 | EMISSION STARTS AFTER 30 MINUTES SINCE RECEIVED SIGNAL STRENGTH REDUCES TO ZERO. |
| 3 | EMISSION STARTS WHEN SIGNAL STRENGTH DOWN TO 20% OF THE MAXIMUM LEVEL. |
| 2 | EMISSION STARTS WHEN DATA EXCHANGE IS COMPLETED. |
| 1 | EMISSION STARTS IMMEDIATELY (I.E., WITH ZERO DELAY). |

| SENT DATA | TIMINGS OF EMISSION |
|---|---|
| ALL OF UADS | EMISSION STARTS AFTER AN HOUR SINCE RECEIVED SIGNAL STRENGTH REDUCES TO ZERO. |
| UADS EXCEPT FOR NAME AND ADDRESS | EMISSION STARTS AFTER 5 MINUTES SINCE RECEIVED SIGNAL STRENGTH REDUCES TO ZERO. |
| AVATAR IMAGE DATA | EMISSION STARTS AFTER 3 MINUTES SINCE RECEIVED SIGNAL STRENGTH REDUCES TO ZERO. |
| TEXT MESSAGE | EMISSION STARTS A MINUTE LATER REGARDLESS OF SIGNAL STRENGTH. |

FIG. 5

| SIMILARITY OF ATTRIBUTES | TIMINGS OF EMISSION |
|---|---|
| 0-25% | EMISSION STARTS AFTER AN HOUR SINCE RECEIVED SIGNAL STRENGTH REDUCES TO ZERO. |
| 25-50% | EMISSION STARTS AFTER 10 MINUTES SINCE RECEIVED SIGNAL STRENGTH REDUCES TO ZERO. |
| 50-100% | EMISSION STARTS AFTER 10 MINUTES SINCE RECEIVED SIGNAL STRENGTH REDUCES TO ZERO. |
| REGISTERED | EMISSION STARTS IMMEDIATELY AFTER DATA EXCHANGE. |

FIG. 6

| LOCATION | TIMINGS OF EMISSION |
|---|---|
| UNAVAILABLE | EMISSION STARTS AFTER 5 MINUTES SINCE RECEIVED SIGNAL STRENGTH REDUCES TO ZERO. |
| LANDMARK INFORMATION | EMISSION STARTS AFTER 5 MINUTES SINCE RECEIVED SIGNAL STRENGTH REDUCES TO ZERO. |
| IN STATION | EMISSION STARTS AFTER 3 MINUTES SINCE RECEIVED SIGNAL STRENGTH REDUCES TO ZERO. |
| IN CROWD | EMISSION STARTS AFTER 1 MINUTE SINCE RECEIVED SIGNAL STRENGTH REDUCES TO ZERO. |

FIG. 7

| | LIGHT | SOUND | VIBRATION |
|---|---|---|---|
| 5 | × | × | ○ (ACTIVATED WITHOUT DELAY) |
| 4 | ○ (ACTIVATED AN HOUR LATER) | × | ○ (ACTIVATED WITHOUT DELAY) |
| 3 | ○ (ACTIVATED 20 MINUTES LATER) | ○ (ACTIVATED 5 MINUTES LATER) | ○ (ACTIVATED WITHOUT DELAY) |
| 2 | ○ (ACTIVATED 5 MINUTES LATER) | ○ (ACTIVATED 5 MINUTES LATER) | ○ (ACTIVATED WITHOUT DELAY) |
| 1 | ○ (ACTIVATED WITHOUT DELAY) | ○ (ACTIVATED WITHOUT DELAY) | ○ (ACTIVATED WITHOUT DELAY) |

METHOD OF CONTROLLING NOTIFICATION AT A COMMUNICATION TERMINAL

CROSS-REFERENCE TO RELATED APPLICATIONS

This application is based on and claims priority under 35 U.S.C. 119 from Japanese Patent Application No. 2011-283691, which was filed on Dec. 26, 2011.

BACKGROUND

1. Technical Field

The present invention relates to wireless communication.

2. Related Art

In the art of wireless communication, there exists a mobile device that is carried by a user and sends/receives data by radio to/from a correspondent device located within a predetermined range relative to the mobile device. There is provided on the mobile device a LED that is controlled to emit light when data is sent to or received from the correspondent device so as to notify the user of occurrence of data exchange with the correspondent device.

SUMMARY

In one aspect of the present invention, there is provided a method of communicating between first and second communication terminals, the method comprising: exchanging data between the first and second communication terminals, the second communication terminal being located within a predetermined range relative to the first communication terminal; and notifying, at the first communication terminal, a user of the first communication terminal of an exchange of data after waiting for a predetermined time period from exchange of data.

BRIEF DESCRIPTION OF THE DRAWINGS

Exemplary embodiments of the present invention will now be described in detail based on the following figures, wherein:

FIG. 5 exemplifies data stored in a table T2;

FIG. 6 exemplifies data stored in a table T3;

FIG. 7 exemplifies data stored in a table T4;

DETAILED DESCRIPTION

Figure 1:
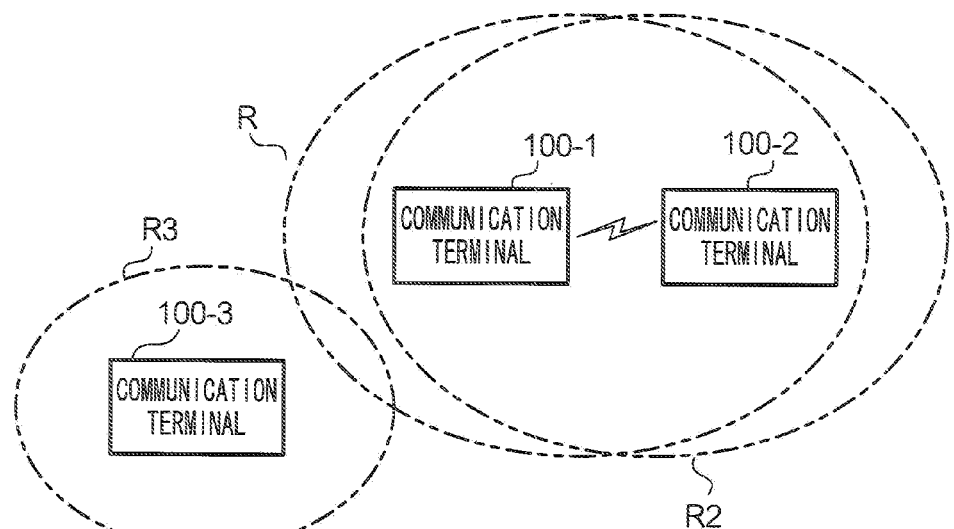
FIG. 1 is a schematic representation of a positional relationship of communication terminals capable of performing data communications within a predetermined range.

FIG. 1 is a schematic representation of a positional relationship of communication terminals that perform data communication within a predetermined range. Each of communication terminals 100 (100-1, 100-2, 100-3) is carried by a different user. Thus, positional relationships of the communication terminals 100 change dependent upon movements of the users.

Figure 2:
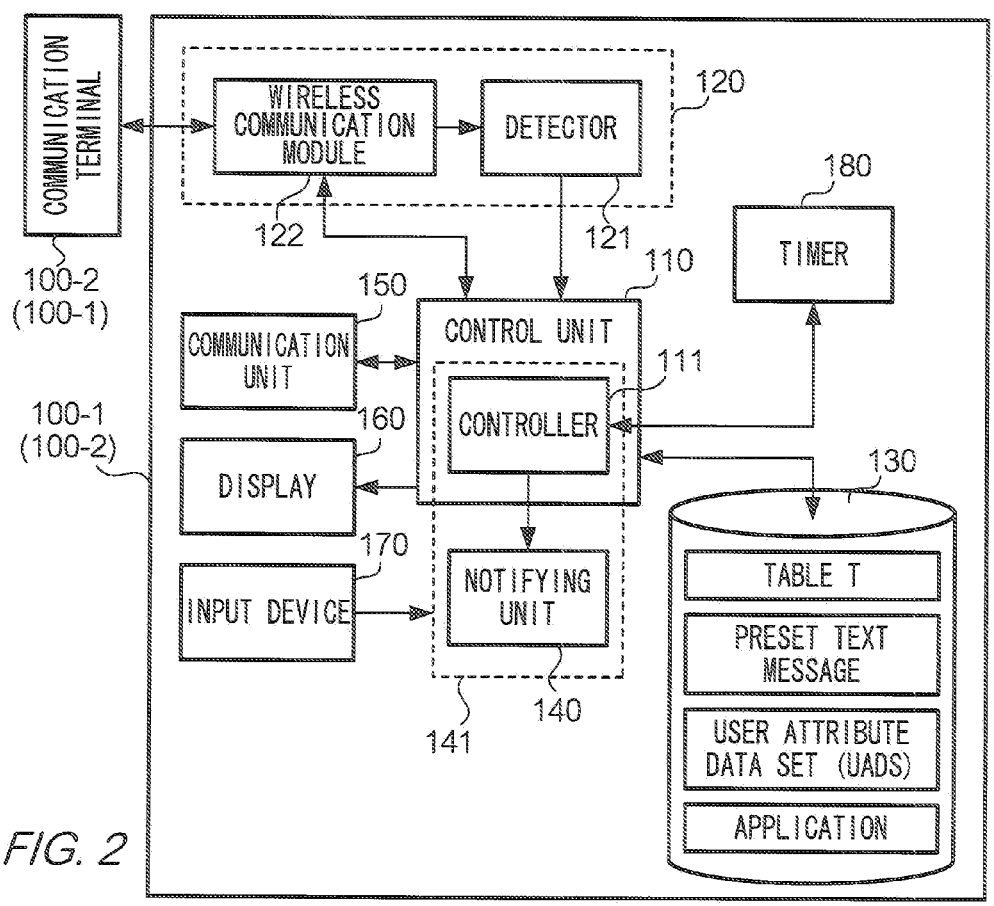
FIG. 2 shows a functional configuration of a communication terminal 100.

FIG. 2 shows a functional configuration of communication terminal 100. As shown in the figure, communication terminal 100 includes control unit 110, communication unit 120, storage unit 130, notifying unit 140, communication unit 150, display 160, input device 170, and timer 180. Control unit 110 includes a CPU or other processor for accessing storage unit 130 thereby to execute an operating system (OS) program and application programs (hereinafter referred to collectively as "an application"), and read/write data, for control of communication unit 120, communication unit 150, display 160, and input device 170. As shown in the figure, detailed functions of control unit 110, which relates to communication unit 150, display 160, and input device 170 are omitted for the sake of convenience of explanation. On the contrary, the function for controlling notifying unit 140 based on information obtained by communication unit 120 is shown in the figure.

Communication unit 120 transmits a radio wave that propagates in an area defined by a predetermined distance from communication terminal 100 under control of control unit 110 and receives a radio signal transmitted from a device located in the area. Thus, data can be exchanged via radio between communication terminals 100. For example, supposing that there is no obstacle to the radio signal the predetermined distance may be 30 meters. In the same figure, areas reachable by the radio signal are indicated by R, R2, and R3. Communication unit 120 includes wireless communication module 122 and detector 121. Wireless communication module 122 establishes a radio link with another communication terminal 100 and sends/receives data via the radio link. Communication unit 120 includes an antenna and radio signal processing circuit operable in conformity with a predefined wireless communication protocol such as IEEE 802.11a, or the like, to supply data received from another communication terminal 100 to control unit 110 and send information to another communication terminal 100 via radio link under control of control unit 100. Detector 121 includes a signal processing circuit that determines whether there is another communication terminal 100 within range of communication terminal 100 based on a radio signal received by wireless communication module 122 and outputs a result of the determination.

Specifically, communication unit 120 searches for a communication terminal located in a predetermined range using a method described below or a like method, and establishes a radio link with a detected communication terminal thereby to transmit data to and receive data from the detected communication terminal using a radio link. In such a case, for the purpose of description, a correspondent communication terminal communicating with communication terminal 100-1 shall be referred to as communication terminal 100-2. Each communication unit 120 of communication terminals 100-1 and 100-2 intermittently transmits a beacon by radio using a designated communication protocol, and awaits a response from a correspondent terminal located within a predetermined range. The communication protocol may be a protocol in which a master or slave mode is set in each communication terminal 100 effective for a predetermined time period, with the modes being switched at either regular or random intervals. More specifically, communication terminal 100-1 when in master mode intermittently transmits a beacon including an identifier (c.f. MAC address) of communication terminal 100-1 and checks whether a response to the beacon including the identifier is received. On the other hand, when communication terminal 100-2 is in slave mode it does not transmit a beacon during a wait period for receipt of a beacon. Upon receipt of a beacon, at communication terminal 100-2 the terminal transmits a response that includes identifiers for each of communication terminals 100-1 and 100-2. Upon receipt of the response at communication terminal 100-1, a radio link between communication terminals 100-1 and 100-2 is established. After a radio link is established, in communication terminal 100-1 control unit 110 reads from the storage unit 130 a preset text message and sends the message to communication terminal 100-2 and receives a preset text message from communication terminal 100-2 stored in the storage unit of communication terminal 100-2.

It is to be noted that a search for communication terminal 100-2 and exchange of data with communication terminal 100-2 automatically initiates at communication terminal 100-1. In other words, commencement of exchange of data is not dependent on user-instruction input. Preferably, normal mode and sleep mode are set selectively in communication terminal 100 when in operation. Sleep mode is a state in which partial functionality of communication terminal 100 is active. Communication terminal 100 may change from normal mode to sleep mode when a condition exists such that no input by a user is received for a predetermined time period, for example. Communication unit 120 can be active in either normal mode or sleep mode. Thus, a user carrying communication terminal 100 can perform data communication with another user without any need to operate communication terminal 100. Communication terminals 100-1, 100-2, and 100-3 have the same function(s), and hereafter for convenience of description will be collectively referred to as "communication terminal 100," in so far as it is not necessary to distinguish one such terminal from another.

Display 160 includes a liquid crystal display, image processing circuit, and the like, to display images, characters, or other information. Input device 170 includes a key pad, buttons, cursor keys or other devices for operating an application, devices for inputting instructions or other information into communication terminal 100, a speaker, microphone or other devices for inputting and outputting information by audio, a memory slot or other reader/writer for reading/writing from/to an external storage unit.

Storage unit 130 includes a RAM, ROM, hard drive or other storage device, that stores an operating system, applications, user attributes data set (UADS) including a name, address, sex, age and the like, and communication terminal 100 including an identifier such as its MAC address, number of times communication terminal 100 is turned on, an accumulated time over which communication terminal 100 has been used, data used by the applications, and may also include aviator image data, text data (hereinafter referred to as a preset text message), which data are sent automatically to a correspondent terminal when a radio link is established with the correspondent terminal, and setting information used for establishing the radio link. Additionally, tables by which operations of notifying unit 140 are determined are stored in storage unit 130.

Communication unit 150 includes an antenna and a processing circuit to enable communication signals from the unit to communicate with other devices, either wirelessly or by wire. For example, communication unit 150 is configured to access data on a server on the Internet via a wireless access point running a predetermined communication protocol. Data obtained from the server may include a position of communication terminal 100 and may include additional information related to the position. Timer 180 includes a crystal oscillator, an oscillation circuit, and the like, for counting time. Counted time is supplied to control unit 110.

Notifying unit 140 generates sensory stimuli that are imparted to a user of communication terminal 100 by way of light, sound, vibration, smell, or the like. Thus, notification at communication terminal 100 is realized by a combination of controller 111 and notifying unit 140. As for generation of a stimulus by light, notifying unit 140 includes an element for emitting light such as a light emitting diode (LED) and controlling circuit thereof to emit light of a predetermined wavelength for a predetermined time period. The LED light may be emitted either continuously or intermittently. As for generation of stimuli by sound, notifying unit 140 includes a speaker, microphone, amplifier, and audio signal processor, to produce a sound based on an audio signal input. As for generation of vibration, a motor is embedded in a body of communication terminal 100 to vibrate the body for a predetermined period. For the sake of convenience, the description of notifying unit 140 will now be directed mainly to a function of emitting light.

Control unit 110 includes controller 111 that controls notifying unit 140. Controller 111 supplies an instruction for activation to notifying unit 140 after waiting for a predetermined period of time, which period commences from a time instant in which data is exchanged with the correspondent terminal. Thus, notifying unit 140 is not activated immediately upon occurrence of data exchange with a correspondent terminal but rather after a predetermined time has passed following commencement of the data exchange. In other words, a time delay is enforced before operation of notifying unit 140 commences. It is to be noted that "waiting" used above does not necessarily mean that all processing performed in communication terminal 100 is stopped for a predetermined period, but rather is used to denote enforcement of a predetermined delay in activating notifying unit 140.

A wait time, or amount of delay, is determined based (a) on a positional relationship between communication terminal 100 and a correspondent terminal, or (b) on whether a predetermined time commencing from a time instant at which data is exchanged with the correspondent terminal has passed. Depending on operating conditions, either (a) or (b) may be implemented. Alternatively, an amount of delay can be determined based on a combination of a positional relationship and on whether a predefined time has passed.

The positional relationship may be defined, for example, based on a distance between the two terminals. A strength of a received, signal supplied from detector 121 is employed to determine the positional relationship. This is possible since, generally, there exists a negative correlation between signal strengths and distances between terminals involved in a communication by radio, assuming that there does not exist any object of interference between the terminals. For example, if a signal strength at one of the correspondent terminals diminishes to zero, it will be determined that the other correspondent terminal has moved beyond a predetermined range, namely a range in which communication is possible, distant from the terminal at which a signal strength is deemed to have diminished to a value of zero, namely, the correspondent communication terminals are no longer within a range in which they can communicate with each another. Determination of whether a predefined period of time has passed is made based on a time count supplied by timer 180. Since there is generally no correlation among directions in which users move, except for a case, for example where users of correspondent terminals are known to each other and are each walking towards a destination that is the same, it is estimated that a time period that passes is greater as the correspondent users move further apart from one another. Thus, changing a timing of notification by means of light, which is performed by the notifying unit 140, results in multi-level protection of privacy.

Figures 3, 4:
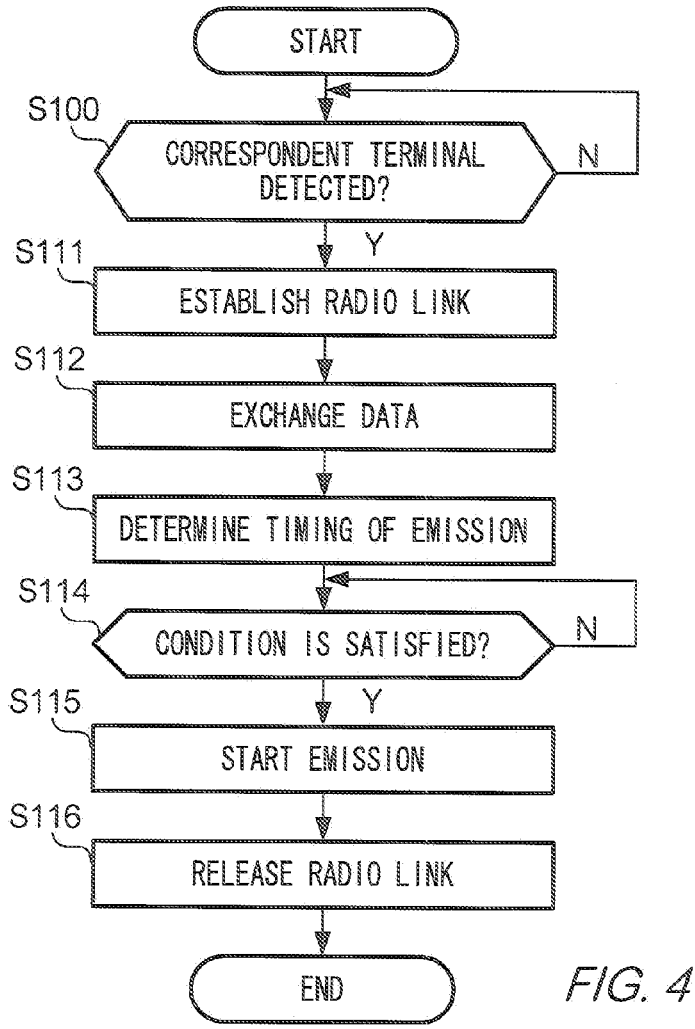
FIG. 3 exemplifies data stored in a table T1.
FIG. 4 shows an operation performed in the communication terminal 100.

Preferably, timing of starting notification may be determined referring to storage unit 130, in addition to the criteria described above. FIG. 3 shows an example of details of Table T1 stored in storage unit 130, by which a timing of emission of light is determined. Table T1 stores privacy levels and timings of emission of light correspondingly. The privacy level is an indicator representative of a possibility of being found by a user of a correspondent terminal communicating via the radio link, in other words, a possibility that a user of the correspondent terminal can perceive a notification, i.e., emission of light in this example, performed at communication terminal 100. In the example shown in FIG. 3, there are five privacy levels introduced in which the highest privacy is defined as Level 5 and the lowest as Level 1. The timing of emission defines a timing at which the notifying unit should be activated to start emitting light. As shown in the figure, the timing of emission can depend on signal strength received from the correspondent terminal.

Specifically, "emission inactivated" at privacy level 5 means that an emission of light is never performed for notifying data exchange. In this case, it is not possible for a user of the correspondent terminal to perceive communication terminal 100 by means of emitted light. As a result, privacy of a user of communication terminal 100 is completely protected. That means, in turn, that it is not possible for the user of communication terminal 100 to perceive the exchange of data by means of light. Conversely, privacy level 1 is suitable for a salutation in which protection or privacy is not considered, i.e., a user of communication terminal 100 does not wish to prevent or delay perceived by others. At privacy level 1, emission of light starts immediately after an establishment of a radio link, regardless of signal strength. For example, emitted light is a light blinking at a predetermined time interval lasting for 3 seconds.

An emission of light results in an increased risk of being perceived by a user of the correspondent terminal, which may depend on a condition of a positional relationship with the correspondent terminal or visibility affected by buildings nearby. On the other hand, a user of communication terminal 100 has a benefit of being immediately notified of an exchange of data performed with the correspondent terminal.

Timings corresponding to privacy levels 2-4 are timings that depend on at least strength of a signal received from a correspondent terminal and a predetermined time period. At privacy level 2, emission of light starts after 3 minutes have passed since completion of data exchange. At privacy level 3, emission of light starts when signal strength reduces to 20%. At privacy level 4, emission of light starts after 30 minutes have passed after signal strength becomes zero. Implementing different time delays to the timing on initiating emission facilitates flexible protection of privacy.

A privacy level may be set by a manufacturer of communication terminal 100 or by a retailer. The privacy level may be set to level 3 as a default. A user may input a desired privacy level via input device 170. In this case, a user can determine a privacy level, taking into account a condition of a location, which may include information on visibility and whether the user is located in a crowd, or other factors relating to privacy risks. In this case, it is possible to manage privacy protection in conformity with conditions at the user's location.

Alternatively, the privacy level may be determined based on data obtained from a correspondent terminal when the radio link is established or exchanged on the established radio link. For example, information on a communication terminal or a user of the correspondent terminal stored in communication terminal 100 is employed. Specifically, a user exchanges with his/her acquaintances, by email or in person, user identification information such as user ID and user name, and identification information of a communication terminal such as its MAC address, and stores the obtained information in storage unit 130.

When identification information of a user or correspondent terminal is received from the correspondent terminal via the radio link, communication terminal 100 determines whether the received information has already been registered in storage unit 130. If the information is registered, the privacy level is set lower than usual (Level 2, for example) in communication terminal 100. The identification information of a user or a correspondent terminal may be data generated by an application running in communication terminal 100, which performs a function of chatting with others or another application for communicating with others. In other words, friends known only through Internet communication can be registered as well as friends known in person. As a result, emission of light is executed with a smaller delay when data is exchanged with a registered user who may be a friend or in a closer relationship, compared to a case where data is exchanged with an unregistered user. In this case, a user is rapidly informed of an encounter with a known user.

FIG. 4 shows an example of an operation performed in communication terminal 100. Hereinafter, a correspondent terminal that can communicate with communication terminal 100-1 shall be referred to as communication terminal 100-2. Communication terminal 100-1 continuously searches for a device that can communicate with communication terminal 100-1 following powering on of communication terminal 100-1 (S100). It is not necessary for a user to watch a screen or manipulate communication terminal 100-1 during a search. Preferably, communication terminal 100 remains in sleep mode during a search. When a positional relationship between communication terminals 100-1 and 100-2 satisfies a condition in which they can communicate with each other, a radio link between them is established (S100, Y and S111).

Next, preset text messages are exchanged between communication terminals 100-1 and 100-2 by a predetermined communication protocol (S112). Specifically, communication terminal 100-1, which is a master device at this moment, reads the preset text message from the storage unit 130 and transmits a request for data exchange including the read preset text message to communication terminal 100-2. Upon receipt of the request, the communication terminal 100-2 stores the received message, reads a preset message from storage unit 130 of communication terminal 100-2 and transmits the read message to communication terminal 100-1. In one embodiment, avatar image data, a user attribute data set (UADS), or additional data may be exchanged between communication terminal 100-1 and 100-2 in addition to the preset text messages. After completion of the data exchange, communication terminals 100-1 and 100-2 continuously monitor a strength of a received radio signal transmitted by a correspondent terminal via the radio link.

After completion of the data exchange, communication terminals 100-1 and 100-2 perform processing that is the same. Thus, description will be directed to an operation in one of the terminals in communication (hereinafter referred to simply as communication terminal 100) for convenience of explanation.

In S113, controller 111 determines a timing of emission of light. Specifically, Table T1 stored in the storage unit 130 and a privacy level currently effective for communication terminal 100 are referred to. For example, if the privacy level is set to Level 3, it is determined that light emission starts when a signal strength is down to 20% of the maximum level. If a determined timing depends on a delay time, controller 111 sets timer 180 based on the determined timing and starts counting. If the determined timing depends on signal strength, controller 111 continues monitoring a strength of a received radio signal transmitted by the correspondent terminal. If the determined timing does not depend on signal strength, controller 111 terminates the radio link to end monitoring of signal strength with regard to the correspondent terminal.

Next, controller 111 determines whether a condition defined by the determined timing of emission is satisfied in S114. Determinations are repeated until the condition is satisfied. If the condition is satisfied, controller 111 outputs an execution instruction to notifying unit 140. Upon receipt of the execution instruction, notifying unit 140 is activated to start emitting light in S115. Next, controller 111 ends monitoring of the signal strength if the monitoring has been performed, and terminates the radio link in S116.

A criterion, as appropriate, can be selected from among a variety of criteria for designating a start point of the delay time. In one embodiment, a count at timer 180 starts at a time when data exchange commences. However, the count may be set to start at a time at which the data exchange finishes, as opposed to a time at which the data exchange commences. In another embodiment, a count start time is dependent on a signal strength. For example, the count may start when the signal strength reduces by 50% as compared to signal strength present at commencement of establishment of a radio link. Any reference value, as appropriate, can be used to evaluate current signal strength.

In yet another embodiment, the signal strength related to a timing of starting the count is determined based on a content of the preset text message sent to the correspondent terminal.

Simply stated, it is possible to associate a timing of emission, which is related to at least one of signal strength indicative of a positional relationship with the correspondent terminal and a lapsed time after which a start point as appropriate can be set, with details of the start point being sent to the correspondent terminal. As a result, data privacy can be adjusted readily depending on data to be provided to a correspondent user, but without any necessity to designate a particular user each time data exchange occurs.

In the exemplified embodiment described above, emission of light is initiated after a delay relative to a start time of data exchange is being performed. As a result, when data exchange is performed, a risk of a sender of the data being identified at the correspondent terminal by a user of the terminal is minimized, although a user of the communication terminal is informed of data exchange with the correspondent terminal. A desired level of protection of privacy can be controlled by changing a length in delay of notification of data transmission, ranging from zero to infinite.

OTHER EXEMPLIFIED EMBODIMENTS

The exemplified embodiment described above can be modified in as a variety of ways depending on need, as described below.

(1) With Regard to a Method of Determining Timing of Emission

Several exemplified methods for determining timings of emissions in S113 of FIG. 4 will now be described.

It is possible to determine a timing of emission based on Table T2 stored in storage unit 130. FIG. 5 shows an example of details of Table T2. In table T2, the preset text messages transmitted to a correspondent terminal are associated with timings of emission. Data provided to the correspondent terminal are associated with timings of emission because it is assumed that the provided data reflect, to some extent, a level of protection of privacy preferred by a user. In this example, Table T2 is designed based on an assumption that a high level of confidentiality for data transmitted to a correspondent terminal requires that a higher confidentiality of data provided to others requires that emission of light should not be perceivable readily at correspondent terminals. Specifically, as shown in the same figure, when all the information on user attribute (UADS) stored in storage unit 130 is sent to a correspondent terminal, emission of light is initiated an hour after a time when a zero signal strength is detected. The resulting delay ensures that a likelihood of perception of data receipt by a user to which the data is transmitted will remain low; and thus a longer delay time correlates with transmission and receipt at a correspondent terminal of information deemed to be of high confidentiality.

Alternatively and adversely, it is possible to configure Table T2 such that a delay amount corresponding to a higher chance of perception is associated with information with higher confidentiality. This configuration is based on an assumption that a user is not overly concerned about data privacy for a recipient of information having a high confidentiality, since the user has determined the details of data to be sent to others. Specifically, shorter delays can correlate to provision of data having a higher confidentiality in Table T2.

In another embodiment, timing of light emission at communication terminal 100-1 is determined based on information provided by communication terminal 100-2.

Specifically, in S113 of FIG. 4, reference is made to Table T3 to determine a timing. FIG. 6 shows exemplified details of Table T3. In Table T3, similarities in attribute information and timings of emission are associated with each other. Such attribute information includes a user attribute data set (DADS) and information on attributes of communication terminal 100.

Attributes of communication terminal 100 include a model name, a duration of use, data used by an application, setting information used for establishing a radio link, and other information relating to communication terminal 100, which information is stored in storage unit 130. The UDAS can include a name, address, nickname, sex, age, and other personal information of the user.

Similarity of attribute information is indicative of how a set of attribute information stored in storage unit 130 is similar to a set of the attribute information received via radio link from a correspondent terminal. The similarities are calculated in controller 111 using a known matching algorithm. For example, 0% similarity indicates that there are no similarities between the sets of attribute information, while 100% similarity indicates that the sets of attribute information are completely identical.

Comparison of the similarity with a correspondent terminal is effective in adjusting a privacy level since different correspondent terminals or users of the correspondent terminal can require different levels of protection of privacy. In the configuration shown in the same figure, the less similarity the attribute information has, the higher a privacy level assigned.

Alternatively, it is possible for communication terminal 100-1 to determine a timing of emission for a corresponding terminal 100-2. For example, timing information representative of a time delay to be applied for emission of light is stored in storage unit 130 of communication terminal 100-1 in advance. When data is exchange between communication terminals 100-1 and 100-2, the timing information is sent from communication terminal 100-1 to communication terminal 100-2 in addition to the data. Upon receipt of the timing information, timing of emission of light is controlled based on timing information received at communication terminal 100-2. For example, when the timing information specifies activation after 5 minutes from exchange of data, light is emitted at communication terminal 100-2 after 5 minutes from the data exchange. Additionally, it is possible to employ timing of emission to also control emission at terminal 100-1. In this case, synchronous emission of light is performed at each of communication terminals 100-1 and 100-2.

There is a possibility that terminal 100-1, which transmits the timing information to communication terminal 100-2 may receives further timing information from communication terminal 100-2 during exchange of data. In other words, a conflict in responding to timing information may occur. In this case, communication terminal 100-1 may utilize an algorithm so as to select timing information for controlling light emission. The received timing information may not be necessarily selected.

Alternatively, timing information indicative of a shorter delay may be selected. Specifically, when the timing information defining activation with a delay of 10 minutes is stored in communication terminal 100-1 and timing information indicative of activation with a delay of 10 minutes is received, emission of light starts at each of communication terminals 100-1 and 100-2 simultaneously after a lapse of 10 minutes.

A similarity "Registered" in FIG. 6 refers to a condition that identification information for a correspondent terminal or a user of the correspondent terminal, consisting of a MAC address, user name or the like, has been stored in storage unit 130. If the identification information for the correspondent terminal under communication is registered, light emission starts immediately upon commencement of data exchange. The reason is that it is not anticipated that a high level of privacy will be required for carrying out data exchange with a user who is registered already. Rather, it would be beneficial for a user to notify proximity to a registered user. Alternatively and conversely, Table T3 may be configured such that a low degree of similarity results in a higher level of protection, i.e., a longer delay time, is assigned.

Simply put, a timing of emission may be determined based on (a) information obtained from a correspondent terminal after establishment of a radio link and (b) at least one of a signal strength indicative of a positional relationship with the correspondent terminal and a passed time whose start point can be set at any time instant. In this way, a protection level can be adjusted appropriately without a need for input of explicit instructions by a user.

In yet another embodiment, the timing of emission is determined based on a Table T4 in S113 of FIG. 7. FIG. 7 shows an example of details of Table T4. In Table T4, information at a location where data exchange with a correspondent terminal is performed and timings of light emission are associated with each other. Such information on a location may include, for example, information for identifying a location based on a latitude and longitude, for example; information indicative of a nearby landmark; information on a function of location, which may indicate whether the location is in a station, at a crosswalk, and the like; and information on an environment, which may be indicative of how congested the locating is, how many communication terminals that can communicate with each other are present within the location, and the like. Specifically, communication terminal 100 obtains information on a current location of communication terminal 100 and stores the obtained information in the storage unit 130. For example, a user inputs the information on a regular basis. Alternatively, communication terminal 100 may receive information from access points on a predetermined schedule. The information may be provided by a server on the Internet via an access point. Communication terminal 100 may obtain GPS data by communication unit 150 in which a function of communicating with a GPS system is additionally provided.

Control unit 110 checks whether obtained information on a current location of communication terminal 100 is identical to a location registered in Table T4. If the obtained information is registered, the timing of emission associated with the registered location is adopted.

As shown in the same figure, a shorter delay is assigned for a location where there are more people, making for a user of the correspondent terminal to perceive emitted light harder.

In one embodiment, when a user does not wish to be perceived by others in a particular place, location information of the particular place and "never perform emission" (not shown in the figure) may be registered as a timing of emission. As a result, a restriction on a place where emission of light can be performed is reflected in configuration of a level of protection of privacy.

Figures 8, 9:
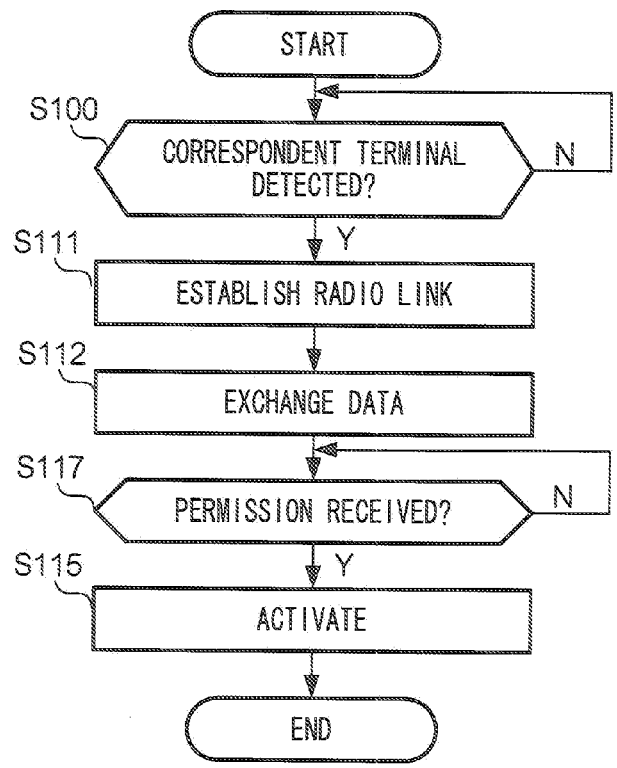
FIG. 8 shows another example of an operation performed in the communication terminal 100.
FIG. 9 exemplifies data stored in a table T5.

Determination of the timing and/or generation of an instruction of starting an emission may be preformed by the correspondent terminal. FIG. 8 shows another example of an operation of communication terminal 100-1. An operation before data exchange on an established radio link is same as of the embodiment explained above referring to FIG. 4. This example differs in exchanged data in part. Specifically, data obtained from correspondent terminal 100-2 includes an instruction to suspend the emission of light. Upon receipt of the instruction, communication terminal 100-1 waits until receiving a subsequent instruction from the correspondent terminal 100-2 (S117, NO) to resume the suspended operation. Upon receipt of the instruction to resume the suspended operation, communication terminal 100-1 activates notifying unit 140 for start of emission of light (S117, Y and S115), in accordance with the instruction issued. In a case where a user of correspondent terminal 100-2 wishes to be informed immediately of an increase in proximity thereto of communication terminal 100-1, a user of communication terminal 100-1 will respond to the requirement of the user of terminal 100-2 by assigning a delay time of a smaller value, in the expectation that the shorter delay time will be acceptable to the user of communication terminal 100-1.

Instead obtaining instructions from communication terminal 100-2 that specify an explicit timing for waiting and resuming operation, information can be sent communication terminal 100-1 from correspondent terminal 100-2 whereby timing of emission can be determined at communication terminal 100-1.

(2) With Regard to a Combination of Different Kinds of Notification

Rather than notifying a user of data transmission by way of light emission, the user can be notified by activation of another function of notifying unit 140, which functions include sounding of a ring tome, generating vibration within a body of communication terminal 100, activating release of a particular odor at the terminal, and the like. In addition, it is possible for notifying unit 140 to activate two or more functions at the same time. Specifically, control unit 110 can determine a timing of notification and notification means to be activated based on Table T5 stored in storage unit 130 in S113 of FIG. 4. FIG. 9 shows an example of details of Table T5, which table defines functions to be activated and timings for activation, with the functions including light emission, sounding of a ring tone, generating vibration in the body of the terminal, and the like. In FIG. 9, "x" indicates that notification is not to be performed, while "o" indicates that notification is to be performed at a timing in accordance with the description in parenthesis. As shown in the same figure, when a privacy level is set to Level 3, vibration starts immediately, and sounding of a ring tone starts following 5 minutes after start of data exchange, while emission of light starts after 20 minutes from a time at which a signal strength reduces to zero.

In addition to or in combination with timing of notification, it is possible to control an amount or level of the notification. For example, at least one of an intensity of emitted light, volume of a ring tone, and intensity of vibration can be controlled. Specifically, privacy levels or estimated positional relationships with a correspondent terminal are stored in association with each other in advance, and criteria for notification are determined based on such association. For example, if it is estimated on a basis of signal strength that a distance to a correspondent terminal is relatively close, light is emitted at a first intensity; while, conversely, if it is estimated on a basis of signal strength that a distance is greater than a predetermined threshold light is emitted at a second intensity that is greater than the first intensity, and for a predetermined duration.

Instead of implementing a changeable intensity of light, a length of duration of emission or an interval of blinking light can be made changeable. In this way, emission of light can be adjusted comparatively flexibly according to a time-dependent position of a user of the correspondent terminal.

The values written in Table T5 are not necessarily an absolute value, but may be a relative value with respect to a reference value. For example, notations of "100%," "50%," and the like, can be adopted, which in a case that the reference value is set to 10 minutes, the values would equate to 10 minutes and 5 minutes, respectively.

(3) Others

There may exist a case such that three or more communication terminals are allowed to communicate to exchange data simultaneously. For example, when three communication terminals are located proximate to each other in a communication area, one of the terminals is designated to function as a master device while the remaining terminals are designated to function as slave devices. It is to be noted that there is a possibility that a timing of notification determined for one pair of communication terminals may be different from a timing determined for another pair of communication terminals. In this case, a timing corresponding to the highest protection level may be adopted because any correspondent user involved in the simultaneous communication will become aware of light emission signifying data emission.

Notification performed by notifying unit 140 may indicate that data exchange with a correspondent terminal has completed, and that communication terminal 100 is preparing for exchange of data with a correspondent terminal, or that data has been either received at or transmitted from the correspondent terminal. Simply put, the notification indicates information relating to: an establishment of a radio link; detection of a correspondent terminal; or details of data transmitted to or received from the correspondent terminal.

The correspondent terminal need not be a mobile communication device. For example, a correspondent terminal need not be a handheld device but could be a desktop computer in which a module for performing wireless communication is provided, for example. The present invention can be adapted to a situation in which a relative position of two communication terminals is changeable on a time dependent basis. In other words, a method according to the present invention includes: establishing a radio link between the first and second communication terminals, the second communication terminal located in a predetermined range designated with reference to the first terminal; estimating a positional relationship between the first and second communication terminals; and notifying, at the first communication terminal, a user of the first communication terminal of the establishment of radio link or the exchange of data, the notification being controlled depending on the estimated positional relationship The communication terminals described above may be an information-processing device including a mobile gaming console, a mobile phone, a Smartphone, PDA, or hand-held PC. Also, any appropriate method for implementing the functions described above by hardware resources can be adopted. A program executable in communication terminal 100, by which the functions are implemented, can be stored in a magnetic recording medium such as a magnetic tape device, magnetic disk (hard drive), optical recording medium such as CD and DVD, a magneto-optical recording medium, or a semiconductor memory, or other computer-readable storage medium, or alternatively, can be provided via the Internet.

The foregoing description of the embodiments of the present invention is provided for purposes of illustration and description, and is in no way to be taken as either exhaustive or specifically limitative of the present invention; and it will be obvious to those skilled in the art that a wide range of modifications and variations can be applied to the invention described in the exemplified embodiments, with such embodiments having been chosen merely with a view to providing a clear explanation of the principles of the present invention and its range of practical application, thereby to enable others skilled in the art to understand the invention in the context of a variety of embodiments, which can be adopted within the scope of the invention so as to best suit a contemplated use. The scope of the invention is intended to be defined by the claims that follow and equivalents thereof.

What is claimed is:

1. A method of communicating between first and second handheld wireless communication terminals, comprising:
    exchanging data over an established link between the first and second handheld wireless communication terminals, the second handheld wireless communication terminal being located within a wireless communication range of the first handheld wireless communication terminal;
    determining a timing for emitting an alert by looking up a configured privacy level in a privacy level table stored in a memory of the first handheld communication terminal, wherein the privacy level table associates each of a plurality of privacy levels with a respective timing for emitting an alert; and
    notifying, at the first handheld wireless communication terminal, a user of the first handheld wireless communication terminal of the exchanging upon receiving from a timer in the first handheld wireless communication terminal an indication regarding a passing of a predetermined time period from when the exchanging is completed, wherein the notifying is performed upon receiving the indication from the timer and in accordance with the determined timing.

2. The method of communication according to claim 1, wherein the notification is performed by means of at least one of light, sound, and vibration.

3. A handheld communication terminal comprising:
    a wireless network interface;
    a memory storing a privacy level table which associates each of a plurality of privacy levels with a respective timing for emitting an alert; and
    at least one processor communicatively coupled to the wireless network interface and configured to:

exchange, using the wireless network interface, data over an established link with a correspondent handheld terminal located within a wireless communication range of the handheld communication terminal;

determine a timing for emitting an alert by looking up a configured privacy level in a privacy level table stored in a memory of the handheld communication terminal; and notify a user of the handheld communication terminal of the exchange upon receiving from a timer in the handheld communication terminal an indication regarding a passing of a predetermined time period from when the exchange is completed, wherein the notifying is performed upon receiving the indication from the timer and in accordance with the determined timing.

4. The handheld communication terminal according to claim 3, wherein the at least one processor is further configured to start notification when the correspondent handheld terminal moves by a predetermined distance away from the handheld communication terminal.

5. The handheld communication terminal according to claim 4, wherein the t at least one processor is further configured to determine, based on a strength of a radio signal received from the correspondent handheld terminal, whether the correspondent handheld terminal has moved by the predetermined distance away from the handheld communication terminal.

6. The handheld communication terminal according to claim 3, wherein the at least one processor is configured to start notification after a predetermined time has passed from the exchange.

7. The handheld communication terminal according to claim 3, wherein the predetermined time is determined based on data received from the correspondent handheld terminal.

8. The handheld communication terminal according to claim 3, wherein the predetermined time is determined based on data transmitted to the correspondent handheld terminal.

9. The handheld communication terminal according to claim 3, wherein the predetermined time is determined based on attributes of user data of the correspondent handheld terminal.

10. The communication terminal according to claim 3, wherein the predetermined time is determined based on whether the correspondent handheld terminal or a user of the correspondent handheld terminal is registered in the handheld communication terminal.

11. The handheld communication terminal according to claim 3, wherein the predetermined time is determined based upon a time of a receipt of data from correspondent handheld terminal at the handheld communication terminal.

12. The handheld communication terminal according to claim 3, wherein the at least one processor is further configured to start notifying the user about the exchange at least in response to a duration from a time of receiving data at the handheld communication terminal exceeding the predetermined time period.

13. The handheld communication terminal according to claim 3, wherein the notifying includes performing notification by means of at least one of light, sound, and vibration.

14. A non-transitory computer-readable storage medium storing a program that, when executed by a computer of a first handheld communication terminal, causes the computer to perform operations comprising:

exchanging data over an established link with a correspondent handheld terminal located within a wireless communication range of the handheld communication terminal;

determining a timing for emitting an alert by looking up a configured privacy level in a privacy level table stored in a memory of the first handheld communication terminal, wherein the privacy level table associates each of a plurality of privacy levels with a respective timing for emitting an alert; and notifying a user of the first handheld communication terminal of an exchange of data upon receiving from a timer in the first handheld communication terminal an indication regarding a passing of a predetermined time period from when the exchange is completed, wherein the notifying is performed upon receiving the indication from the timer and in accordance with the determined timing.

15. The non-transitory computer readable storage medium according to claim 14, wherein the operations further comprise performing said notification by means of at least one of light, sound, and vibration.

16. A system comprising:
a plurality of a first handheld communication terminals,
a first handheld communication terminal of the plurality of handheld communication terminal comprising:
  a wireless network interface;
  a memory storing a privacy level table which associates each of a plurality of privacy levels with a respective timing for emitting an alert; and
  at least one processor communicatively coupled to the wireless network interface and configured to:
    exchange data over an established link with a correspondent handheld terminal located within a wireless communication range of the first handheld communication terminal;
    determine a timing for emitting an alert by looking up a configured privacy level in a privacy level table stored in a memory of the first handheld communication terminal; and
    notify a user of the first handheld communication terminal of an exchange of data upon receiving from a timer in the first handheld communication terminal an indication regarding a passing of a predetermined time period from when the exchange is completed wherein the notifying is performed upon receiving the indication from the timer and in accordance with the determined timing.

17. The system according to claim 16, wherein the at least one processor is further configured to perform said notification by means of at least one of light, sound, and vibration.

* * * * *